United States Patent
Wu et al.

(10) Patent No.: US 9,301,660 B2
(45) Date of Patent: Apr. 5, 2016

(54) LAMINAR COMPOSITE TOILET LID AND SEAT

(75) Inventors: Chengdong Wu, Allen, TX (US); Jie Zhang, Allen, TX (US)

(73) Assignee: Topseat International, Inc., Plano, TX (US)

(*) Notice: Subject to any disclaimer, the term of this patent is extended or adjusted under 35 U.S.C. 154(b) by 979 days.

(21) Appl. No.: 13/486,872

(22) Filed: Jun. 1, 2012

(65) Prior Publication Data

US 2012/0255107 A1    Oct. 11, 2012

Related U.S. Application Data

(63) Continuation-in-part of application No. 13/083,161, filed on Apr. 8, 2011.

(51) Int. Cl.
*A47K 13/14* (2006.01)
*A47K 13/02* (2006.01)
*B32B 21/02* (2006.01)
*B32B 27/10* (2006.01)
*B32B 27/30* (2006.01)

(52) U.S. Cl.
CPC ............. *A47K 13/02* (2013.01); *B32B 21/02* (2013.01); *B32B 27/10* (2013.01); *B32B 27/308* (2013.01); *B32B 2317/12* (2013.01); *B32B 2317/16* (2013.01); *B32B 2319/00* (2013.01); *B32B 2333/12* (2013.01); *B32B 2509/00* (2013.01); *Y10T 156/10* (2015.01); *Y10T 428/24851* (2015.01); *Y10T 428/31663* (2015.04); *Y10T 428/31855* (2015.04)

(58) Field of Classification Search
CPC .............................. A47K 13/24; A47K 13/02
USPC ........................................... 4/242.1, 234, 237
See application file for complete search history.

(56) References Cited

U.S. PATENT DOCUMENTS

| | | | | |
|---|---|---|---|---|
| 1,829,526 | A | | 10/1931 | Leslie |
| 2,771,612 | A | * | 11/1956 | Samuels ........................ 4/237 |
| 3,484,876 | A | | 12/1969 | Thomas |
| 3,863,277 | A | * | 2/1975 | Harrison ........................ 4/237 |

(Continued)

FOREIGN PATENT DOCUMENTS

| | | |
|---|---|---|
| CN | 101664289 A | 3/2010 |
| GB | 422797 A | 1/1935 |

(Continued)

OTHER PUBLICATIONS

Notification of transmittal of the International Search Report of the International Searching Authority dated Jan. 25, 2013 in connection with International Patent Application No. PCT/US2012/025864.

(Continued)

*Primary Examiner* — Huyen Le

(57) ABSTRACT

Embodiments of the present disclosure include a laminate composite toilet lid and seat and a method of manufacturing thereof. The toilet lid includes a core structural layer having a shape and size associated with the toilet lid. The toilet lid also includes first and second resilient layers disposed on first and second surfaces of the core structural layer. The toilet lid further includes a plurality of exterior layers disposed on exterior surfaces of the core structural layer and the first and second resilient layers, the exterior layers configured to envelop the toilet lid.

20 Claims, 4 Drawing Sheets

(56) References Cited

U.S. PATENT DOCUMENTS

| | | | |
|---|---|---|---|
| 4,115,127 A * | 9/1978 | Ikeda et al. | 430/278.1 |
| 4,318,213 A * | 3/1982 | Blount | 29/434 |
| 5,829,073 A | 11/1998 | Lee | |
| 6,640,349 B2 * | 11/2003 | Toldo et al. | 4/237 |
| 8,506,742 B2 | 8/2013 | Terfloth et al. | |
| 2005/0076424 A1 | 4/2005 | Mattinly | |
| 2005/0186393 A1 | 8/2005 | Wilson | |
| 2007/0298229 A1 | 12/2007 | Rasmusson et al. | |
| 2008/0008885 A1 | 1/2008 | Terfloth et al. | |
| 2009/0068453 A1 | 3/2009 | Chung | |
| 2011/0146792 A1 | 6/2011 | Wu et al. | |

FOREIGN PATENT DOCUMENTS

| | | |
|---|---|---|
| GB | 2021176 A | 11/1979 |
| GB | 2 380 444 A | 4/2003 |
| WO | WO 2004110743 A1 | 12/2004 |

OTHER PUBLICATIONS

Written Opinion of the International Searching Authority dated Jan. 25, 2013 in connection with International Patent Application No. PCT/US2012/025864.

US Office Action, dated Sep. 26, 2014 in connection with U.S. Appl. No. 13/083,161; 10 pages.

Notification of transmittal of the International Search Report and the Written Opinion of the International Searching Authority dated Jan. 25, 2013 in connection with International Patent Application No. PCT/US2012/025864.

Extended European Search Report dated Feb. 16, 2015 in connection with European Patent Application No. 12767262,4; 6 pages.

Communication Pursuant to Rules 70(2) and 70a(2) EPC dated Mar. 5, 2015 in connection with European Patent Application No. 12767262.4; 1 page.

US Office Action dated Jul. 1, 2015 in connection with U.S. Appl. No. 13/083,161; 9 pages.

\* cited by examiner

LAMINAR COMPOSITE TOILET LID AND SEAT

CROSS REFERENCE TO RELATED APPLICATION

This patent application is a continuation-in-part that claims priority under 35 U.S.C. §120 to U.S. patent application Ser. No. 13/083,161 filed on Apr. 8, 2011, which is incorporated herein by reference.

TECHNICAL FIELD

This disclosure is generally directed to toilets and more particularly to a toilet lid and seat that are formed of a laminar composite material.

BACKGROUND

Toilet seats and lids have existed in various forms for many decades. A toilet seat provides a surface for an occupant to comfortably sit and a toilet lid provides a protective cover for the toilet facility. Generally, toilet seats and lids are made of wood or plastic materials. These materials can degrade, discolor, and/or become damaged over time. Thus, many toilet seats and lids may become unattractive, structurally unsound, or both.

Additionally, most toilet seats and lids have plain, unadorned surfaces that do not include any type of decoration or permit any artistic expression. Some conventional toilet seats have surfaces that are adorned with silk-screen printing, hand painting, water-transfer printing, heat transfer printing, and the like. However, the surfaces of these seats, like plain toilet seats, can wear, chip off, degrade, or otherwise become damaged over time. There are also polyresin toilet seats that are made from resin compounds and are typically clear with optional decorative inserts. However, polyresin toilet seats are typically heavy and expensive to manufacture.

SUMMARY

According to an embodiment of the present disclosure, a composite laminar material includes a core structural layer. The composite laminar material also includes first and second resilient layers disposed on first and second surfaces of the core structural layer. The composite laminar material further includes a plurality of exterior layers disposed on exterior surfaces of the core structural layer and the first and second resilient layers.

In another embodiment, a toilet lid includes a core structural layer having a shape and size associated with the toilet lid. The toilet lid also includes first and second resilient layers disposed on first and second surfaces of the core structural layer. The toilet lid further includes a plurality of exterior layers disposed on exterior surfaces of the core structural layer and the first and second resilient layers, the exterior layers configured to envelop the toilet lid.

In still another embodiment a method of manufacturing a toilet lid includes preparing a core structural layer of the toilet lid. The method also includes applying first and second resilient layers to first and second surfaces of the core structural layer. The method further includes applying a plurality of exterior layers to exterior surfaces of the core structural layer and the first and second resilient layers.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure provides a laminar composite toilet lid and seat configured to include decorative or aesthetic elements. The composite toilet lid and seat according to this disclosure offers many advantages. The toilet lid and seat may be customized with one or more images to convey a message or impression that may be of interest to a user. In addition, the toilet lid and seat according to this disclosure is constructed to be more durable and retain its original appearance for a longer period than conventional toilet lids and seats.

The laminar composite toilet lid and seat according to embodiments of this disclosure may be constructed with seven (7) layers of material: a core structural layer, two resilient layers disposed on top and bottom surfaces of the core structural layer, two decorative graphic layers disposed on outside surfaces of the resilient layers, and two exterior finish layers disposed on outside surfaces of the decorative graphic layers and edges of all the layers. All of the layers are integrated together to form a durable, attractive product.

Figure 1:
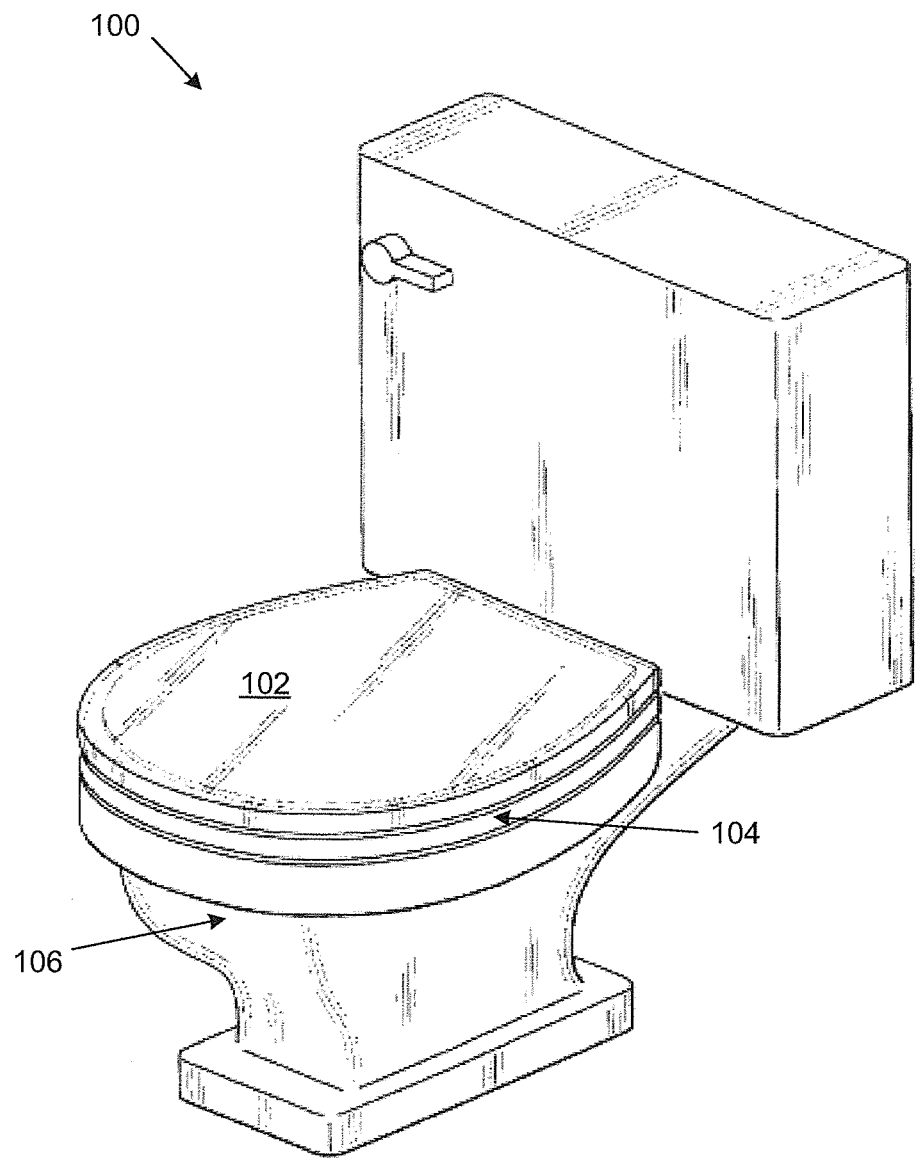
FIG. 1 illustrates a toilet with a laminar composite toilet lid and seat, according to embodiments of the present disclosure.

FIG. 1 illustrates a toilet with a laminar composite toilet lid and seat, according to the present disclosure. The embodiment of the toilet shown in FIG. 1 is for illustration only. Other embodiments of the toilet could be used without departing from the scope of this disclosure.

As shown in FIG. 1, a toilet 100 is fitted with a toilet lid 102 and toilet seat 104 over a bowl 106. The toilet 100 may be any suitable toilet with a bowl that is configured to be covered by a seat and lid. The bowl 106 has an opening that is generally round or oval in shape. The toilet lid 102 and toilet seat 104 have a size and shape configured to generally match the size and shape of the bowl 106 and to cover the opening of the bowl 106. The toilet lid 102 and toilet seat 104 attach to a rear portion of the bowl 106 or toilet 100 using hinged hardware that allow the toilet lid 102 and toilet seat 104 to raise and lower independently with respect to the bowl 106 and to each other, as is known in the art.

Although FIG. 1 depicts one example of a toilet 100 with a toilet lid 102 and toilet seat 104, various changes may be made to FIG. 1. For example, while the bowl 106 is depicted as generally round or oval in shape, the bowl 106 could include other shapes, such as a rectangle or octagon. Likewise, the toilet lid 102 and toilet seat 104 could also include other shapes in order to match, or be different from, the bowl 106.

Figure 2:
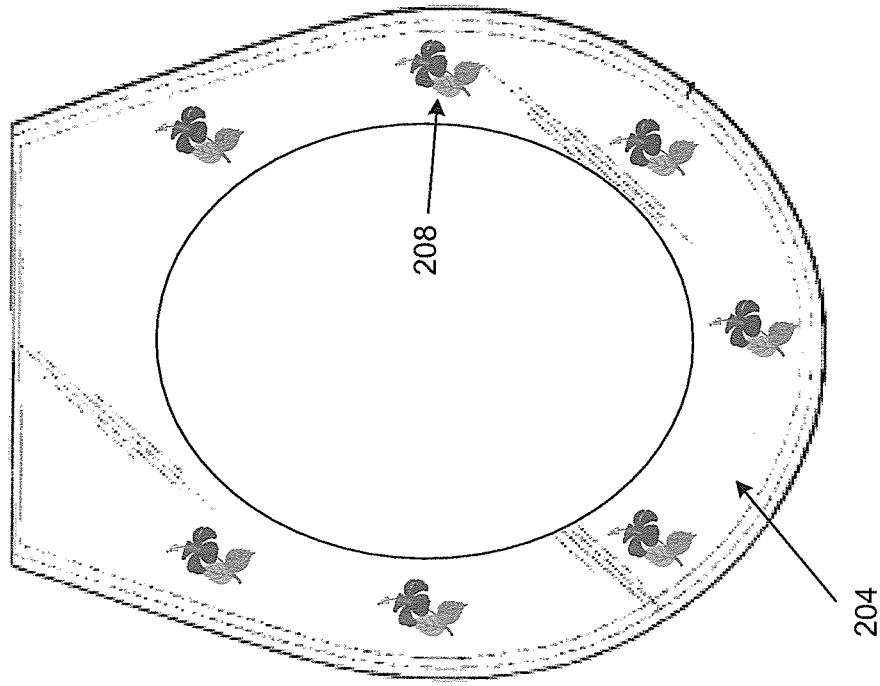
FIG. 2 illustrates top plan views of a laminar composite toilet lid and toilet seat, according to embodiments of the present disclosure.
Figure 2:
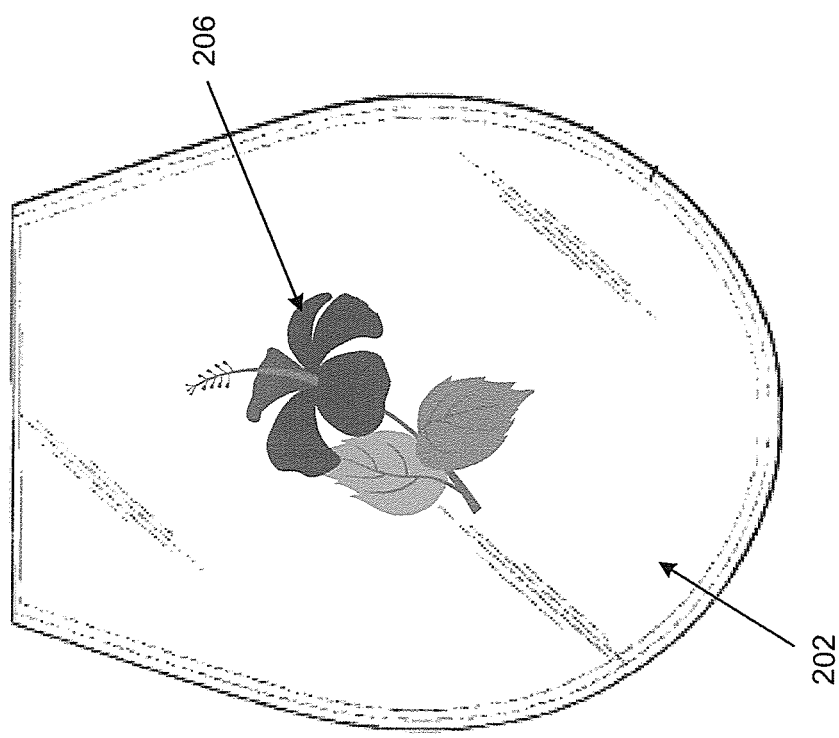

FIG. 2 illustrates top plan views of a laminar composite toilet lid and toilet seat, according to the present disclosure. The embodiment of the toilet lid 202 and toilet seat 204 shown in FIG. 2 is for illustration only. Other embodiments of the toilet lid 202 and seat 204 could be used without departing from the scope of this disclosure. For ease of explanation, the toilet lid 202 and toilet seat 204 may represent the toilet lid 102 and toilet seat 104 of FIG. 1. It will be understood, however, that the toilet lid 202 and toilet seat 204 may represent any other suitable toilet lid and toilet seat.

As shown in FIG. 2, the top surface of the toilet lid 202 includes a decorative graphic 206. Likewise, the top surface of the toilet seat 204 includes one or more decorative graphics 208. The decorative graphics 206, 208 may represent any picture, graphic, text, or other image, and are customizable to appeal to a user of a toilet where the toilet lid 202 and seat 204 are installed. In certain embodiments, the decorative graphics 206, 208 may be chosen to match or coordinate with a particular decorative scheme of a bathroom or restroom where the toilet is installed. In other embodiments, the decorative graphics 206, 208 may be chosen to display or feature a logo or trademark of a business. In still other embodiments, the decorative graphics 206, 208 may be chosen to display or feature a picture or design that reflects an interest or hobby of a homeowner. The decorative graphics 206, 208 are integrated into the laminar composition of the toilet lid 202 and toilet seat 204, as explained in greater detail below. Thus, the decorative graphics 206, 208 are protected from degradation and wear.

Although FIG. 2 depicts one example of a toilet lid 202 and toilet seat 204, various changes may be made to FIG. 2. For example, while the toilet lid 202 and toilet seat 204 are both shown with decorative graphics, in other embodiments, only one of the toilet lid 202 and toilet seat 204 may include a graphic. As another example, while only the top surfaces of the toilet 202 and toilet seat 204 are shown with a decorative graphic, the bottom surfaces of the toilet lid 202 and/or toilet seat 204 may also include a decorative graphic. As yet another example, while the decorative graphics 206, 208 are depicted as having the same image, in other embodiments, the decorative graphics 206, 208 could include different images or coordinating images.

Figure 3A:
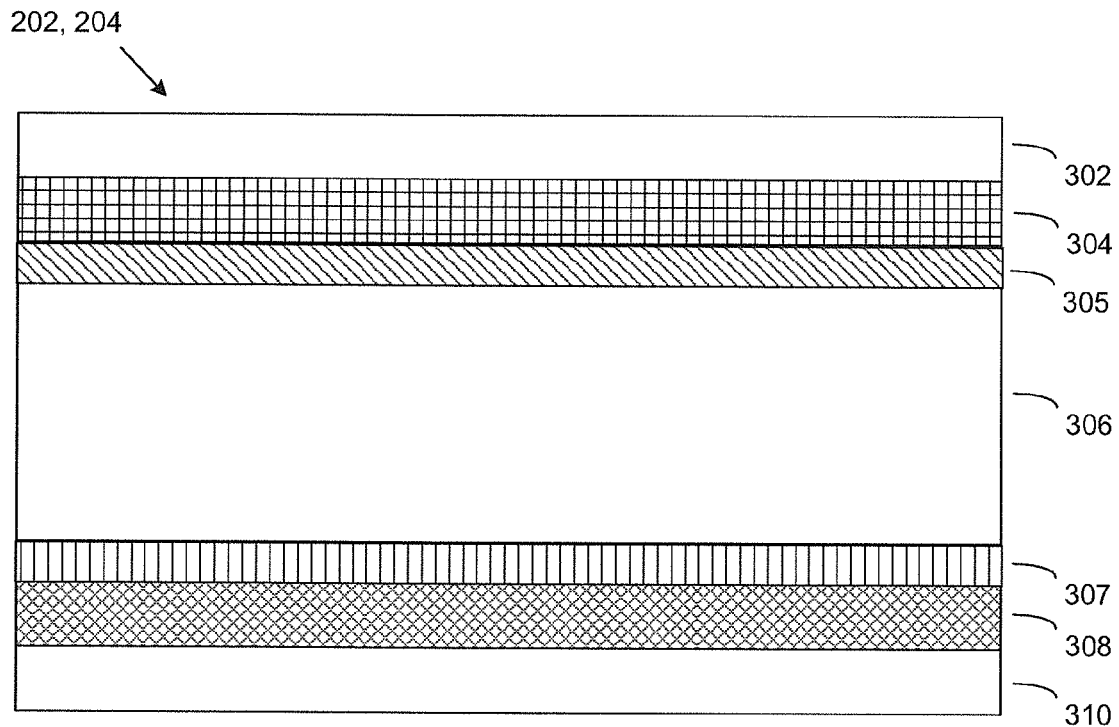
FIGS. 3A and 3B illustrate cross-section views of a laminar composite toilet lid and toilet seat, according to embodiments of the present disclosure.
Figure 3B:
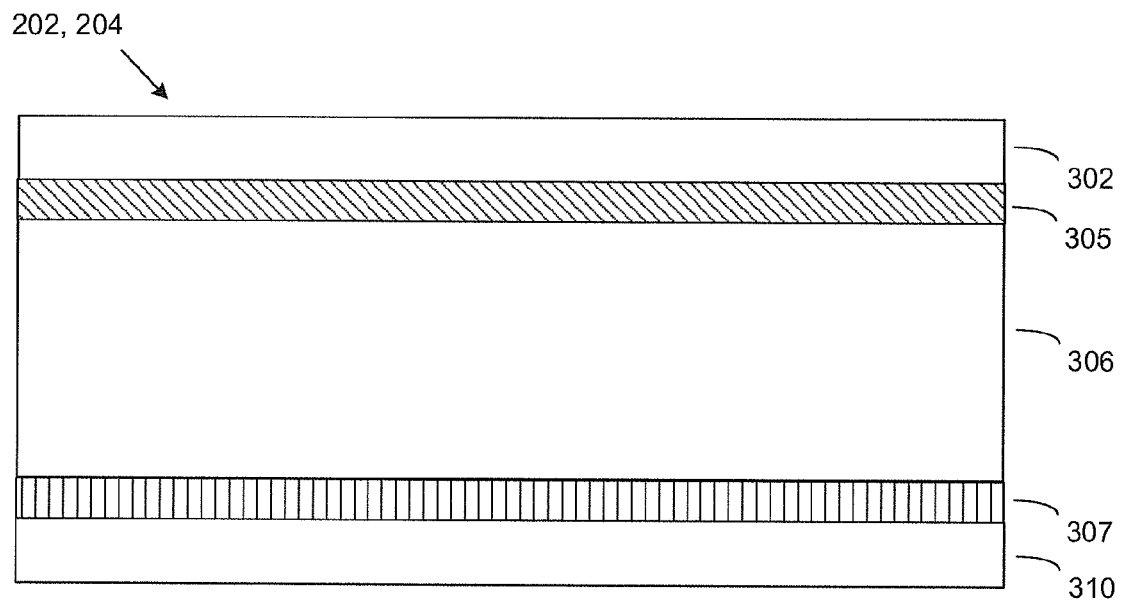

FIGS. 3A and 3B illustrate cross-section views of either the laminar composite toilet lid 202 or the toilet seat 204, according to embodiments of the present disclosure. The embodiments of the toilet lid 202 or toilet seat 204 shown in FIGS. 3A and 3B are for illustration only. Other embodiments of the toilet lid 202 or toilet seat 204 could be used without departing from the scope of this disclosure. For ease of explanation, the following disclosure will refer only to the toilet lid 202. However, it will be understood that the embodiments described below are also applicable to the toilet seat 204.

As shown in FIG. 3A, the toilet lid 202 comprises seven layers 302-310. For clarity of illustration, the thickness of each layer 302-310 may not be drawn to scale. Layer 302 is an exterior finish or coating layer. Layer 304 is a decorative graphic layer. Layer 305 is a resilient layer. Layer 306 is a core structural layer. Layer 307 is a second resilient layer. In certain embodiments, the layer 307 may be composed of the same material as the layer 305. In other embodiments, the layer 307 may be composed of a different material than layer 305. Layer 308 is a second decorative layer. In certain embodiments, the layer 308 may be composed of the same material as the layer 304. In other embodiments, the layer 308 may be composed of a different material than layer 304. Layer 310 is a second exterior finish or coating layer. FIG. 3B illustrates an embodiment of the toilet lid 202 without the decorative graphic layers 304, 308.

In accordance with the present disclosure, the exterior finish layers 302, 310 may be formed of polymethyl-methacrylate (PMMA). PMMA is a transparent, thermoplastic material that is very durable and exhibits excellent optical properties. PMMA is also scratch resistant, can be CNC (computer numerical control) machined, and is more impact resistant than ordinary glass. PMMA is also known by its trade names Plexiglas™ and Lucite™. The thickness of each finish layer 302, 310 may be selected according to the requirements of the application. In one embodiment, the thickness of each finish layer 302, 310 is approximately two millimeters (2 mm). While the exterior finish layers 302, 310 are described as PMMA, the layers 302, 310 may be formed of another special function glass or any other suitable material that exhibits the advantageous properties of PMMA.

In some embodiments, each exterior finish layer 302, 310 is clear and colorless. However, the exterior finish layers 302, 310 are not limited thereto. For example, either one or both of the exterior finish layers 302, 310 may be colored, tinted and/or mirrored. Either one or both of the exterior finish layers 302, 310 may be smooth or textured, and have a glossy or matte finish.

The core layer 306 may be formed of a medium density fiberboard (MDF). As is known in the art, MDF is formed of wood fibers that are held together with one or more waxes or resins such as epoxies, formaldehyde resins, or phenolic resins. The fiber content and thickness of the MDF core layer 306 may vary based on application requirements. The core layer 306 accounts for the majority of the thickness of the toilet lid 202 and provides most of the rigidity of the toilet lid 202. In one embodiment, the thickness of the core layer 306 is approximately nine millimeters (9 mm). In an embodiment, one or both sides of the core layer 306 are painted to hide or protect the finish of the MDF material.

Although the core layer 306 is described as being formed of MDF, other materials may be used. For example, the core layer 306 may be formed of another composite wood, such as hardwood plywood (HWPW), particleboard (PB), high density fiber board (HDF), molded wood, or any other suitable material. In an embodiment, the core layer 306 may be formed of two or more sub-layers, each sub-layer comprising one of the materials described above.

Each of the decorative graphic layers 304, 308 shown in FIG. 3A is formed of a paper or thin plastic material or film onto which an image has been printed, painted, or otherwise formed. Each decorative graphic layer 304, 308 may be sized to cover all, or only a portion, of a surface of the toilet lid 202. In an embodiment, each decorative graphic layer 304, 308 may be completely opaque, thus hiding the underlying surface of the toilet lid 202. In another embodiment, each decorative graphic layer 304, 308, or some portion thereof, may be partially or completely transparent, thus exposing at least part of the underlying surface of the toilet lid 202.

Although the decorative graphic layers 304, 308 have been described as including a particular image, the decorative graphic layers 304, 308 are not limited thereto. For example, in lieu of displaying a decorative or graphic image, one or both layers 304, 308 may be a plain colored paper or film in any suitable color. Thus, a solid white paper could be used to make a white toilet seat. A solid blue paper could be used to make a blue toilet seat.

Each of the resilient layers 305, 307 is formed of a resilient material such as polychloroprene, styrene, butadiene rubber, silicon rubber, or another suitable material with elastic properties. The resilient layers 305, 307 are disposed on top and bottom surfaces of the core layer 306. In one embodiment, each resilient layer 305, 307 is approximately 1 mm thick, although each resilient layer 305, 307 may be thicker or thinner as needed for particular applications.

The resilient layers 305, 307 serve as a resilient interface between the core layer 306 and a layer adjacent to the core layer 306, such as the decorative graphic layers 304, 308 (as shown in FIG. 3A) or the exterior finish layers 302, 310 (as shown in FIG. 3B). Due to differences in thermal properties between the materials comprising the core layer 306 and its adjacent layers, the layers of the toilet lid 202 may contract and expand at different rates due to changes in temperature, humidity, or other environmental conditions. These different rates of expansion and contraction among the layers of the toilet lid 202 may result in a slight separation of the layers at the edges. This in turn may cause cracks to form in any additional finish layers, such as a layer of paint that coats the outside surfaces of the toilet lid 202.

To counter the separation and cracking effects that may result from different thermal properties of adjacent layers, the resilient layers 305, 307 are formed between the adjacent layers, such as between the core layer 306 and the exterior finish layers 302, 310. The elastic properties of the resilient layers 305, 307 allow each resilient layer 305, 307 to flex across its cross section. Thus, the surfaces of the adjacent layers that contact each resilient layer 305, 307 can contract and expand at different rates while still maintaining full contact with the resilient layer 305, 307 and without separating from the resilient layer 305, 307. In addition, the outer surfaces of the toilet lid 202 can be coated with a resilient paint that resists cracking or separation.

Although FIGS. 3A and 3B depict examples of a laminar composite toilet lid 202, various changes may be made to FIGS. 3A and 3B. For example, while shown composed of five or seven layers, the laminar composite toilet lid 202 may include more or fewer layers. Layers 302-310 shown in FIGS. 3A and 3B may be removed, repeated, or arranged in a different order. As a particular example, when one or both exterior finish layers 302, 310 are not clear, the adjacent decorative graphic layer 304, 308 may not be visible and may be removed (as in FIG. 3B). Each layer 302-310 may be thicker or thinner than depicted in FIGS. 3A and 3B. Each layer 302-310 may include one or more sub-layers. Other layers, composed of the same or different materials, may be added to the laminar composite toilet lid 202.

Figure 4:
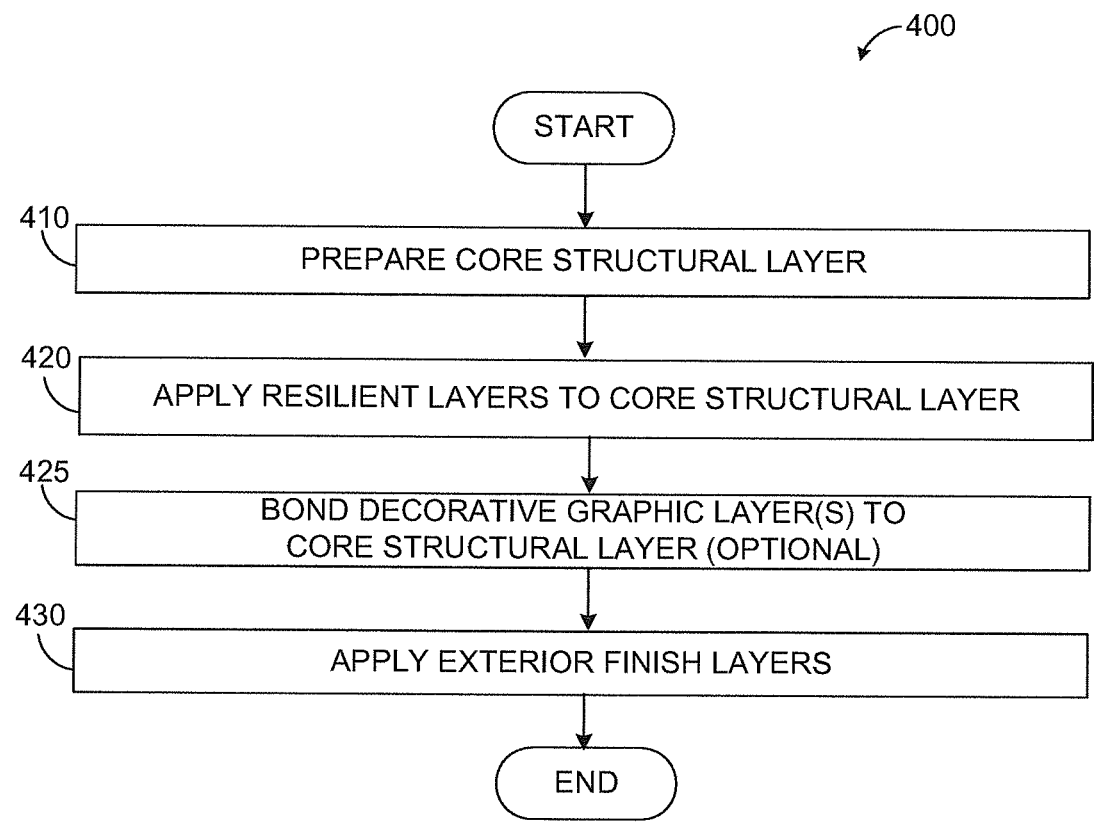
FIG. 4 depicts a method for manufacturing a laminar composite toilet lid and seat, according to embodiments of the present disclosure.

FIG. 4 depicts a method for manufacturing a laminar composite toilet lid and seat (e.g., toilet lid 202 and toilet seat 204), according to the present disclosure. The method shown in FIG. 4 is for illustration only. Other embodiments of the method could be used without departing from the scope of this disclosure.

First, a core structural layer (e.g., layer 306) is prepared having a size and shape suitable for its application (step 410). Preparation of the core structural layer may include painting one or more surfaces of the core structural layer. Next, resilient layers (e.g., layers 305, 307) are applied to the top side, bottom side, or both top and bottom sides of the core structural layer (step 420). Next, in an optional step, a decorative graphic layer (e.g., layers 304, 308) is bonded to the exposed outward surfaces of the resilient layers (step 425). Each decorative graphic layer is bonded to the resilient layers using an adhesive or heat bonding process. If an adhesive is used, the adhesive may be sprayed on, brushed on, or applied in any other suitable manner. In some embodiments, the resilient layers and decorative layers may also be applied to or otherwise cover the edges of the core structural layer.

Next, exterior finish layers (e.g., layers 302, 310) are applied to the externally visible surfaces of the core structural layer, the resilient layers, and/or the decorative graphic layers (step 430). The exterior finish layers may be configured to come together along one or more edges, thus forming one or more seams. The seams may be finished according to known techniques in order to create a smooth transition. In some embodiments, the "top" finish layer is machined or formed such that the "top" layer curves into the "bottom" layer such that there is no distinct edge. In such embodiments, any one or more of the various layers can follow any such contouring. Once the exterior finish layers are completely applied, the exterior finish layers envelop the toilet lid or seat and provide a protective layer that resists wear and damage, but allows the decorative image or images to be seen.

Although FIG. 4 illustrates one example of a method for manufacturing a laminar composite toilet lid and seat, various changes may be made to FIG. 4. For example, while shown as a series of steps, various steps in FIG. 4 may overlap, occur in parallel, occur in a different order, or occur multiple times.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A composite laminar material, comprising:
a core structural layer;
first and second resilient layers disposed on first and second surfaces of the core structural layer, each resilient layer being approximately one millimeter or less in thickness; and
a plurality of exterior layers disposed on exterior surfaces of the core structural layer and the first and second resilient layers,
wherein each resilient layer is configured to counter a separation or cracking effect resulting from a difference in thermal properties between the core structural layer and each of the exterior layers.

2. The composite laminar material of claim 1, wherein the core layer comprises medium density fiberboard (MDF).

3. The composite laminar material of claim 1, wherein each exterior layer comprises polymethyl-methacrylate (PMMA).

4. The composite laminar material of claim 1, wherein each of the resilient layers comprises one of polychloroprene, styrene, butadiene rubber, and silicon rubber.

5. The composite laminar material of claim 1, further comprising at least one decorative graphic layer disposed between one of the exterior layers and one of the resilient layers.

6. The composite laminar material of claim 5, wherein the at least one decorative graphic layer is bonded to the core structural layer using a liquid adhesive.

7. The composite laminar material of claim 5, wherein the at least one decorative graphic layer comprises a paper or plastic film comprising at least one image.

8. A toilet lid, comprising:
a core structural layer having a shape and size associated with the toilet lid;

first and second resilient layers disposed on first and second surfaces of the core structural layer, each resilient layer being approximately one millimeter or less in thickness; and a plurality of exterior layers disposed on exterior surfaces of the core structural layer and the first and second resilient layers, the exterior layers configured to envelop the toilet lid, wherein each resilient layer is configured to counter a separation or cracking effect resulting from a difference in thermal properties between the core structural layer and each of the exterior layers.

9. The toilet lid of claim 8, wherein the core layer comprises medium density fiberboard (MDF).

10. The toilet lid of claim 8, wherein each exterior layer comprises polymethyl-methacrylate (PMMA).

11. The toilet lid of claim 8, wherein each of the resilient layers comprises one of polychloroprene, styrene, butadiene rubber, and silicon rubber.

12. The toilet lid of claim 8, further comprising at least one decorative graphic layer disposed between one of the exterior layers and one of the resilient layers.

13. The toilet lid of claim 12, wherein the at least one decorative graphic layer is bonded to the core structural layer using a liquid adhesive.

14. The toilet lid of claim 12, wherein the at least one decorative graphic layer comprises a paper or plastic film comprising at least one image.

15. A method of manufacturing a toilet lid, the method comprising:

preparing a core structural layer of the toilet lid;

applying first and second resilient layers to first and second surfaces of the core structural layer, each resilient layer being approximately one millimeter or less in thickness; and applying a plurality of exterior layers to exterior surfaces of the core structural layer and the first and second resilient layers, wherein each resilient layer is configured to counter a separation or cracking effect resulting from a difference in thermal properties between the core structural layer and each of the exterior layers.

16. The method of claim 15, wherein the core layer comprises medium density fiberboard (MDF).

17. The method of claim 15, wherein each exterior layer comprises polymethyl-methacrylate (PMMA).

18. The method of claim 15, wherein each of the resilient layers comprises one of polychloroprene, styrene, butadiene rubber, and silicon rubber.

19. The method of claim 15, further comprising:

applying at least one decorative graphic layer between one of the exterior layers and one of the resilient layers.

20. The method of claim 19, wherein the at least one decorative graphic layer is bonded to the core structural layer using a liquid adhesive.

* * * * *